United States Patent
Shavit et al.

(10) Patent No.: US 6,718,492 B1
(45) Date of Patent: Apr. 6, 2004

(54) SYSTEM AND METHOD FOR ARRANGING BITS OF A DATA WORD IN ACCORDANCE WITH A MASK

(75) Inventors: Nir N. Shavit, Cambridge, MA (US); Guy L. Steele, Jr., Lexington, MA (US); Steven K. Heller, Acton, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/545,019

(22) Filed: Apr. 7, 2000

(51) Int. Cl.$^7$ ................................................. G06F 11/00
(52) U.S. Cl. ...................................... 714/701; 714/801
(58) Field of Search ................................ 714/701, 702, 714/799, 800, 801, 802

(56) References Cited

U.S. PATENT DOCUMENTS

| | | | |
|---|---|---|---|
| 4,085,447 A | * | 4/1978 | Pertl et al. |
| 4,583,199 A | | 4/1986 | Boothroyd et al. |
| RE33,664 E | * | 8/1991 | Kang et al. |
| 5,339,447 A | * | 8/1994 | Balmer |
| 5,487,159 A | * | 1/1996 | Byers et al. |
| 5,586,321 A | | 12/1996 | Shavit et al. |
| 5,682,340 A | * | 10/1997 | Arends et al. |
| 5,696,922 A | * | 12/1997 | Fromm |
| 5,777,906 A | | 7/1998 | Lau et al. |
| 5,892,775 A | * | 4/1999 | Jayant et al. .................. 71/701 |
| 5,898,698 A | * | 4/1999 | Bross .......................... 714/701 |
| 5,995,748 A | * | 11/1999 | Guttag et al. |
| 6,098,087 A | * | 8/2000 | Lemay |
| 6,144,986 A | * | 11/2000 | Silver |
| 6,581,170 B1 | * | 6/2003 | Kondo et al. ................ 714/701 |

OTHER PUBLICATIONS

Hillis et al., Data Parallel Algorithms, Comm ACM 29, 12 (Dec. 1986, 1170=1183).
Aspnes et al., "Counting Networks," Journal of the ACM, vol. 41, No. 5 (Sep. 1994).
Knuth, Donald E., "The Art of Computer Programming, vol. 3: Sorting and Searching," Second Edition, 1998 pp. 219–247, Addison–Wesley, Reading, MA,.

* cited by examiner

Primary Examiner—Phung M. Chung
(74) Attorney, Agent, or Firm—Foley Hoag LLP

(57) ABSTRACT

A system is disclosed for providing, from an input data word comprising a plurality of input data units having an input arrangement and a mask word comprising a plurality of mask bits each associated with one of the data units, an output data word in which the data units are arranged according to the mask bits. The system includes a bit balancer module and a plurality of rearrangement modules. The bit balancer module is configured to divide the input data units comprising the input data word into a plurality of data word portions, each data unit being assigned to one of the data word portions based on a pattern of mask bits of the mask word relative to the mask bit associated with the respective data unit. Each rearrangement module is configured to provide, from one of the data word portions and associated mask bits, an output data word portion in which the data units are arranged according to the mask bits. The data units of the output data word portions provided by the rearrangement modules are interleaved to provide the output data word.

17 Claims, 7 Drawing Sheets

SYSTEM AND METHOD FOR ARRANGING BITS OF A DATA WORD IN ACCORDANCE WITH A MASK

INCORPORATION BY REFERENCE

U.S. patent application Ser. No. 09/545,020, filed on even date herewith in the name of Guy L. Steele, Jr., and entitled System And Method For Arranging Bits Of A Data Word In Accordance With A Mask, (hereinafter "the Steele I application") assigned to the assignee of the present application, incorporated by reference.

U.S. patent application Ser. No. 09/545,020, filed on even date herewith in the name of Guy L. Steele, Jr., et al., and entitled System And Method For Arranging Bits Of A Data Word In Accordance With A Mask, (hereinafter "the Steele II application") assigned to the assignee of the present application, incorporated by reference.

FIELD OF THE INVENTION

The invention relates generally to the field of digital computers and more specifically to functional units for processing predetermined types of instructions. The invention particularly provides a circuit or functional unit for use in connection with execution of an instruction for rearranging bits of a data word in accordance with a mask.

BACKGROUND OF THE INVENTION

Computers process data in accordance with instructions. One type of instruction which has been proposed is a so-called "sheep and goats" instruction which accepts as operands a data word and a mask word and rearranges the bits of the data word in accordance with the mask word. In the rearranged data word, the bits of the data word in bit positions which correspond to bits of the mask which are clear, or have the value "zero," are shifted to the "left" end of the rearranged data word with their order being preserved, and the bits of the data word in bit positions which correspond to bits of the mask which are set, or have the value "one," are shifted to the right end of the data word with their order being preserved. For example, if an eight bit data word has the value "abcdefgh" (where the letters represent binary integers having the value "one" or "zero"), and the mask word corresponds to "10011011," in the rearranged data word generated when the "sheep and goats" instruction is executed with these as operands, the bits "b," "c," and "f," all of which are in bit positions for which the mask bits are clear would be shifted to the left, preserving their order "bcf," and the bits "a," "d," "e," "g," and "h," all of which are in bit positions for which the mask bits are set would be shifted to the right, preserving their order "adegh," with the result being the rearranged data word "bcfadegh." Essentially, the "sheep and goats" instruction results in a rearrangement of bits of a data word into two groups as defined by bits of a mask word, one group (the "sheep") corresponding to those bits for which the bits of the mask word are clear, and the other (the "goats") corresponding to those bits for which the bits of the mask word are set, and in addition preservers order in each group In a variant of the "sheep and goats" instruction, the bits of the rearranged data word in bit positions for which the bits of the mask are either set or clear (but preferably not both) will be set to a predetermined value. Generally, it has been proposed that, for example, the bits of the rearranged data word in bit positions for which the bits of the mask are clear will be set to zero, but the variant may be used with either the "sheep" or the "goats," and the predetermined value may be either "one" or "zero."

A "sheep and goats" instruction can find utility in connection with, for example, performing various bit permutations, for example, using a mask consisting of alternating set and clear bits will result in a so-called "unshuffle" permutation of a data word. In addition, the variant can be useful in connection with using a set of originally discontiguous bits to perform a multi-way dispatch, or jump, by making the bits contiguous and using the result to form an index into a jump table.

SUMMARY OF THE INVENTION

The invention provides a new and improved circuit or functional unit for use in connection with execution of an instruction for rearranging bits of a data word in accordance with a mask.

In brief summary, the invention provides a system for providing, from an input data word comprising a plurality of input data units having an input arrangement and a mask word comprising a plurality of mask bits each associated with one of the data units, an output data word in which the data units are arranged according to the mask bits. The system includes a bit balancer module and a plurality of rearrangement modules. The bit balancer module is configured to divide the input data units comprising the input data word into a plurality of data word portions, each data unit being assigned to one of the data word portions based on a pattern of mask bits of the mask word relative to the mask bit associated with the respective data unit. Each rearrangement module is configured to provide, from one of the data word portions and associated mask bits, an output data word portion in which the data units are arranged according to the mask bits. The data units of the output data word portions provided by the rearrangement modules are interleaved to provide the output data word.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
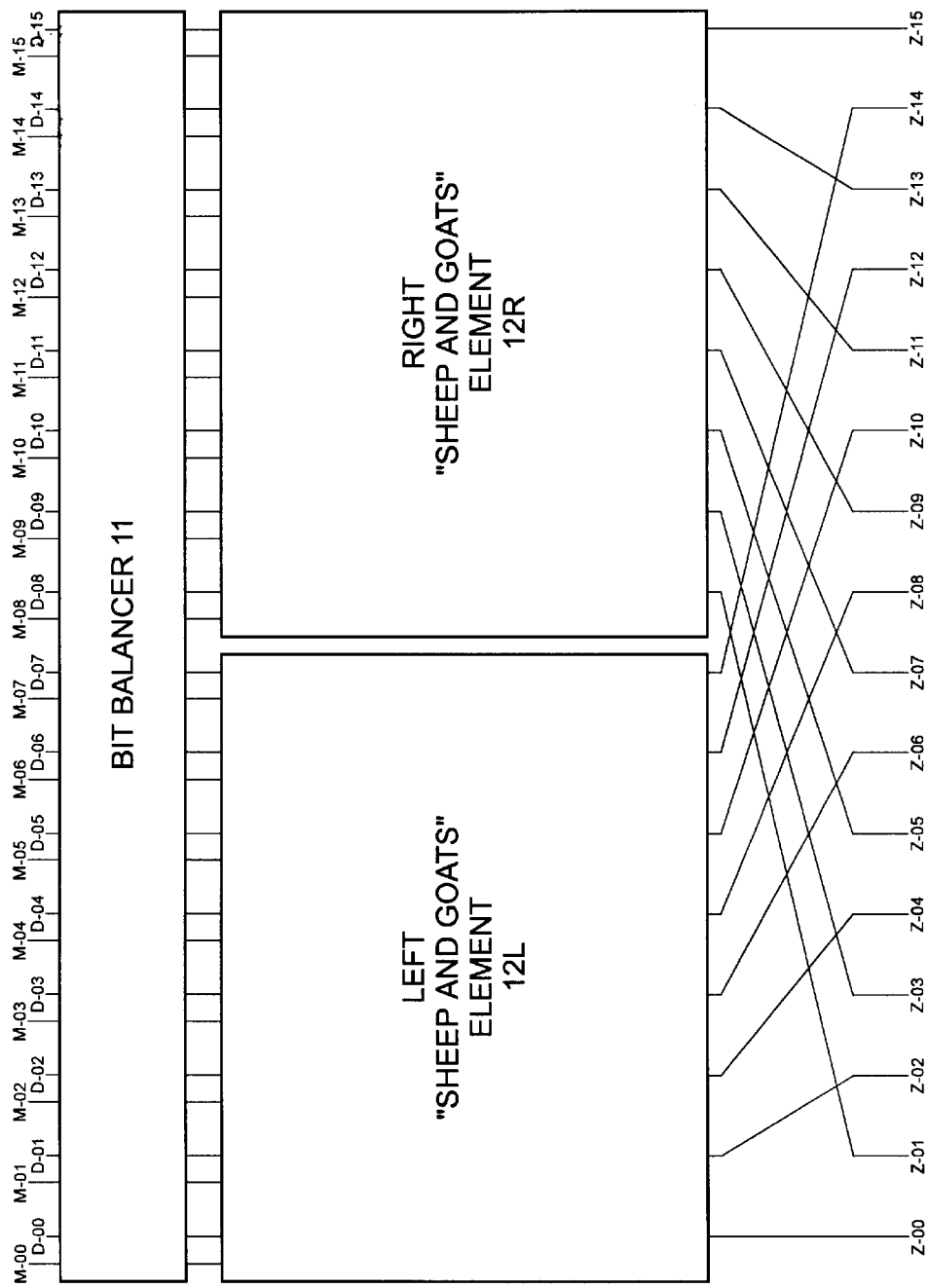
FIGS. 1 through 3 depict functional block diagrams of respective embodiments of a circuit or functional unit for use in connection with execution of an instruction for rearranging bits of a data word in accordance with a mask, in accordance with the invention.
Figure 2:
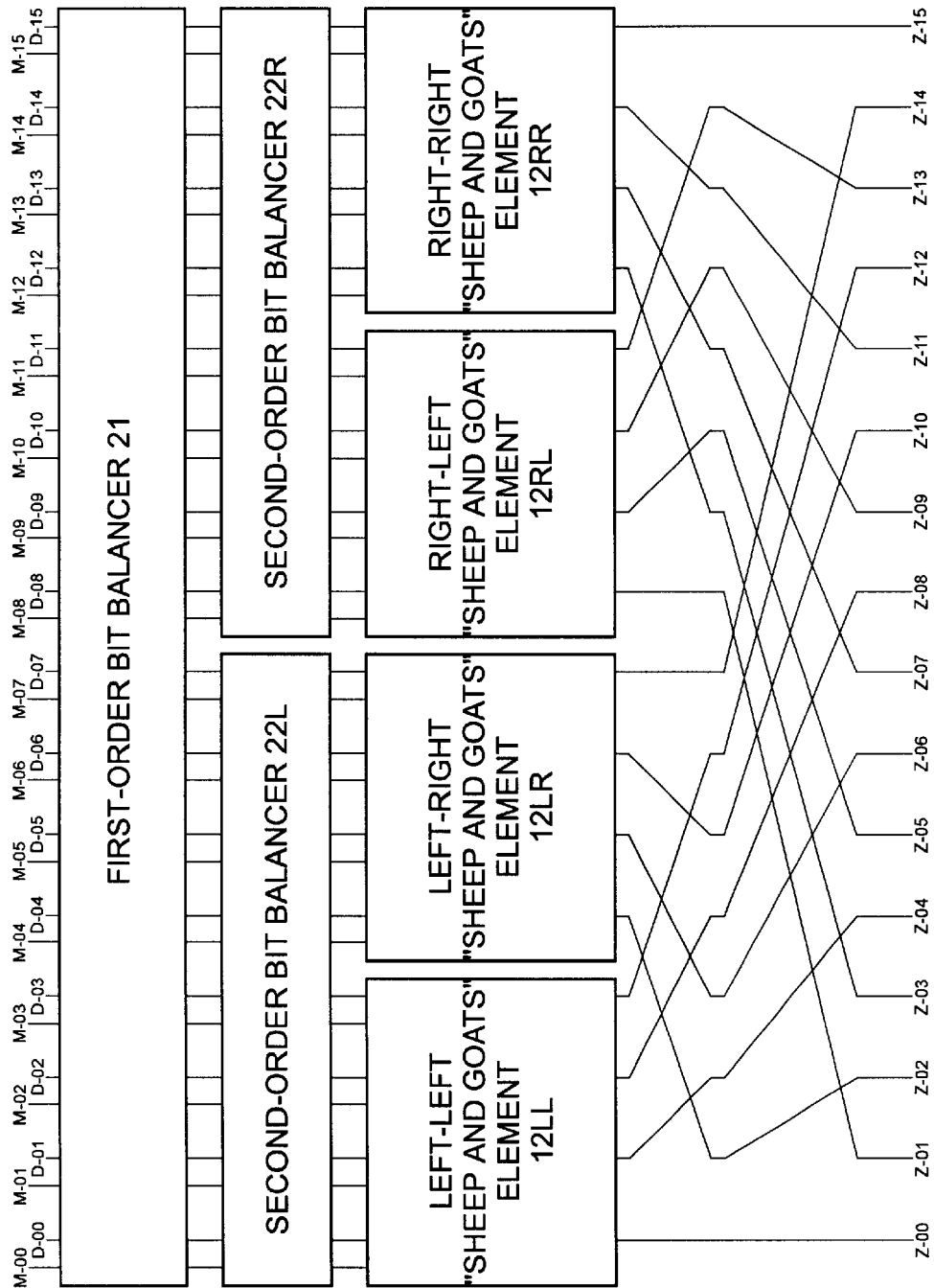
Figure 3:
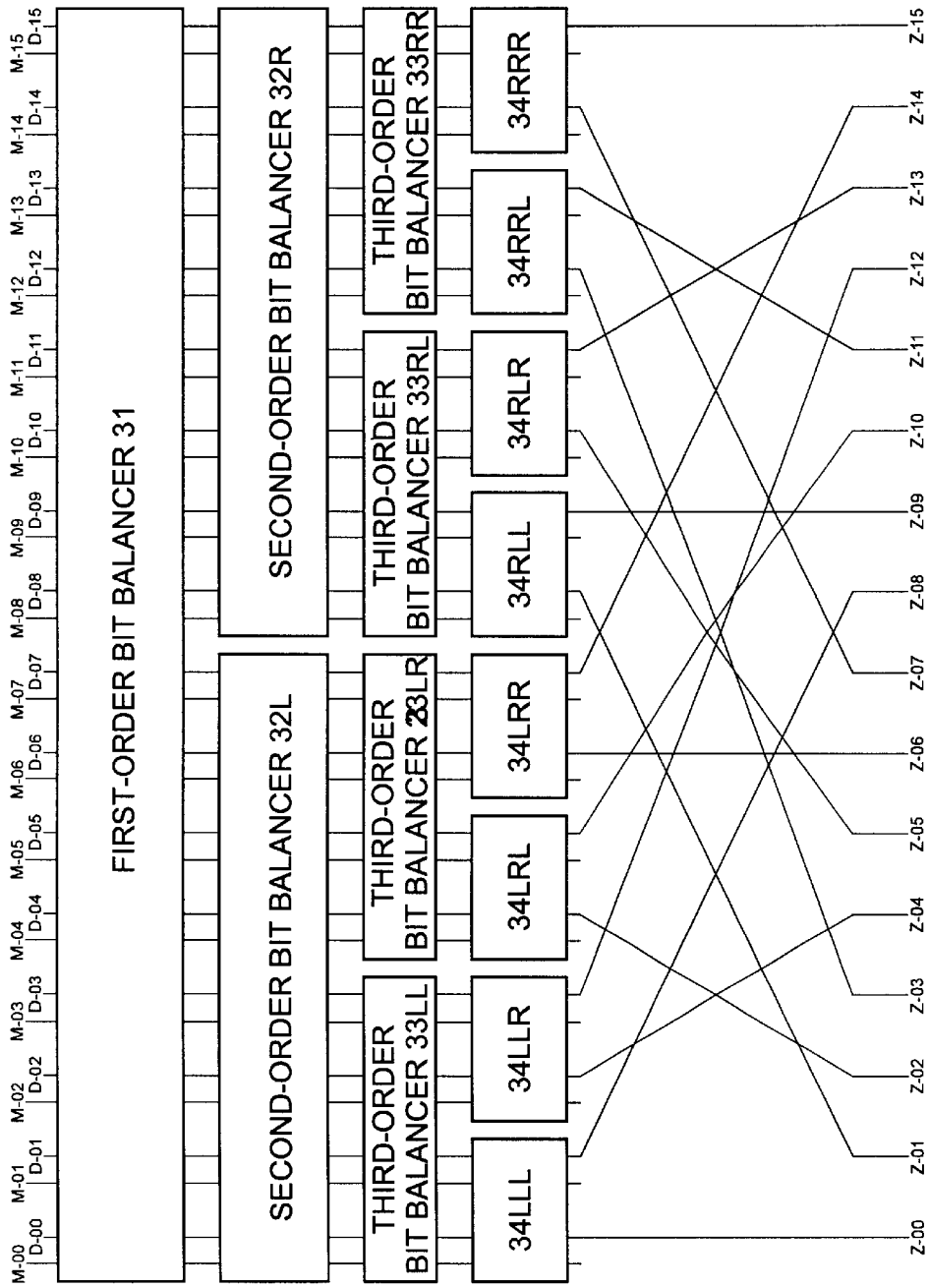

FIGS. 1 through 3 depict functional block diagrams of respective embodiments of a circuit or functional unit for use in connection with execution of an instruction for rearranging bits of a data word in accordance with a mask, in accordance with the invention. With reference initially to FIG. 1, functional unit 10 which receives an "N" bit operand data word comprising data bits in bit positions D0 through DN−1 (generally identified by reference numeral Dn) and an "N" bit mask word comprising mask bits in bit positions M0 through MN−1 (generally identified by reference numeral Dn) and provides an "N" bit output data word comprising bits in bit positions Z0 through ZN−1 (generally identified by reference numeral Zn) whose bits correspond to the bits in bit positions Dn of the input data word for which the bits of the mask word which are clear (that is, which have the binary value "zero") packed to the left in the output word, and the bits in bit positions Dn of the input data word for which the bits of the mask word which are set (that is, which have the binary value "one") packed to the right in the output word, with the order of the bits being preserved as between the group of data bits in bit positions Dn for which the mask bits in bit positions Mn are set and the group of data bits in bit positions Dn for which the mask bits are clear.

The functional unit 10 specifically depicted in FIG. 1 is for use with data words and masks, having sixteen bit positions D0 through D15 and M0 through M15, respectively, but it will be appreciated that the number "N" of bit positions may comprise any convenient number that is divisible by "two."

The functional unit 10 comprises three elements, namely, a bit balancer 11 and two "sheep and goats" elements 12L (for the "left" element) and 12R (for the "right" element). The bit balancer 11 essentially divides the "N" bit operand data word into two N/2 bit data words, referenced as "left" and "right" data words, and accompanying mask bits, which are coupled to the "sheep and goats" elements 12L and 12R. Each "sheep and goats" element 12L and 12R performs a respective "sheep and goats" operation on an N/2 bit data word and accompanying mask bits to order the data bits such that the data bits for which the mask bits are set clear are packed to the left and the data bits for which the mask bits are set are packed to the right in an N/2 bit output word, with the order of the bits being preserved as between the group of data bits for which the mask bits are set and the group of data bits for which the mask bits are clear. The outputs of the "sheep and goats" elements 12L and 12R are then merged to form the output data word Zn. Circuits for the "sheep and goats" elements 12L and 12R may comprise those described in connection with, for example, the Steele I and Steele II patent applications referenced above. The bit balancer 11 essentially divides the "N" bit operand data word and accompanying mask word into two N/2 bit portions, each of which may be processed in a "sheep and goats" element which suffices for processing N/2 data bits, and accompanying mask bits. This facilitates use of "sheep and goats" elements which are less complex than would be required for processing "N" data bits.

Generally, the bit balancer element 11 divides the N-bit operand data word into N/2-bit left and right data words as follows. Generally, the bit balancer 11 enumerates, starting from "zero,"

(i) for each operand data bit in bit position Dn whose associated mask bit in bit position Mn is clear, the operand data bit's position from the left end D0 of the operand data word, as among the set of operand data bits whose associated mask bits in bit positions Mn are clear, (ii) for each operand data bit in bit position Dn whose mask bit in bit position Mn is set, the operand data bit's position from the right end DN−1 of the operand data word, as among the set of operand data bits whose associated mask bits in bit positions Mn are set and provides (a) as the left data word, from (i), the data bits in bit positions Dn and associated clear mask bits in bit positions Mn which are associated with even enumerations and, from (ii), the data bits in bit positions Dn and associated set mask bits in bit positions Mn which are associated with odd enumerations, and (b) as the right data word, from (i) the data bits in bit positions Dn and associated clear mask bits in bit positions Mn which are associated with odd enumerations and, from (ii), the data bits in bit positions Dn and associated set mask bits in bit positions Mn which are associated with even enumerations, with the order of data bits in bit positions Dn and associated mask bits in bit positions Mn being maintained in the left and right data words.

For example, if the mask word is "0 1 1 0 0 0 0 1 0 1 0 0 1 0 1 0" and the operand data word is "a b c d e f g h i j k l m n o p," where each letter in the operand data word represents a binary digit, the bit balancer element 11 enumerates the mask bits as follows:

```
0   1   1   0   0   0   0   1   0   1   0   0   1   0   1   0   (mask word)
0           1   2   3   4       5           6   7       8           9   (clear bit enumeration)
    5   4                   3       2               1       0           (set bit enumeration)
thus, of the bits
a   b   c   d   e   f   g   h   i   j   k   l   m   n   o   p
of the operand data word, it is clear that bits
0           1   2   3   4       5           6   7       8           9   (clear bit enumeration)
a           e       g           k           n
and bits
    5   4                   3       2               1       0           (set bit enumeration)
    b                       h                       m
are to form the left data word, with the result being
a   b           e       g   h           k           m   n
along with associated mask bits
0   1           0       0   1           0           1   0.
Similarly, of the bits of the operand data word, it is clear that bits
0           1   2   3   4       5           6   7       8           9   (clear bit enumeration)
            d       f           i           l                   p
and bits
    5   4                   3       2               1       0           (set bit enumeration)
    c                       j                       o
```

-continued

| form the right data word, with the result being | | | | | | | |
|---|---|---|---|---|---|---|---|
| c | d | f | i | j | l | o | p |
| along with associated mask bits | | | | | | | |
| 1 | 0 | 0 | 0 | 1 | 0 | 1 | 0. |

Thus, it is clear that the bit balancer element 11 maintains order of the data bits, from the operand data word, when providing the left and right data words, and also provides the mask bits in the same order.

In the following the left and right data bits will be identified as DLn and DRn, respectively, and the associated mask bits will be identified as MLn and MRn, respectively, which are coupled to the "sheep and goats" elements 12L and 12R, respectively. As noted above, each "sheep and goats" element 12L and 12R performs a respective "sheep and goats" operation on the DLn left data word, and associated MLn mask bits, and on the DRn right data word, and associated MRn mask bits, respectively, to order the data bits in bit positions DLn and DRn such that the data bits for which the mask bits are clear are packed to the left and the data bits for which the mask bits are set are packed to the right in an N/2 bit output word, with the order of the bits being preserved as between the group of data bits for which the mask bits are set and the group of data bits for which the mask bits are clear. The outputs of the "sheep and goats" elements 12L and 12R are then merged to form the output data word Zn.

In merging the outputs of the "sheep and goats" elements 12L and 12R, the functional unit 10 essentially interleaves the outputs, so that the left-most bit of the left "sheep and goats" element 12L is the left-most output data bit in bit position Z0, the left-most bit of the right "sheep and goats" element 12R is the second left-most output data bit in bit position Z1, and so forth. This provides the appropriate order for the output data word since the data bit of the operand data word that is associated with left-most clear mask bit (if any) is provided as the left-most bit in bit position DL0 of the left data word, the data bit of the operand data word that is associated with second left-most clear mask bit (if any) is provided as the left-most bit in bit position DR0 of the right data word, and so forth. In addition, the data bit of the operand data word that is associated with right-most set mask bit (if any) is provided as the right-most bit in bit position DR(N/2−1) of the right data word, the data bit of the operand data word that is associated with second right-most clear mask bit (if any) is provided as the right-most bit in bit position DL(N/2−1)0 of the left data word, and so forth.

Thus, continuing with the above example, in which the left data word and associated mask bits are:

0 1 0 0 1 0 1 0     (mask bits)

a b e g h k m n     (left data word)

it is clear that the left "sheep and goats" element 12L generates an output as follows:

a e g k n b h m.

Similarly, for the right data word associated mask bits of:

1 0 0 0 1 0 1 0     (mask bits)

c d f i j l o p     (right data word)

the right "sheep and goats" element 12R generates an output as follows:

d f i l p c j o.

When the outputs from the left and right "sheep and goats" elements 12L and 12R are interleaved, the result is a d e f g i k l n p b c h j m o as expected.

As should be clear from the above, in the functional unit 10, the bit balancer element 11 essentially decomposes bits in bit positions Dn of the operand data word, and associated mask bits in bit positions Mn, into two smaller data words, identified as the left and right and right data words DLn and DRn, respectively, which are processed by the "sheep and goats" elements 12L and 12R. FIGS. 2 and 3 depict two further embodiments in which the operand data word is decomposed into successively smaller data words for processing by smaller components, and the bits provided by those smaller components merged to form the bits in bit positions Zn of the rearranged data word. In FIG. 2, functional unit 20 comprises a first order bit balancer 21, two second order bit balancers 22L and 22R, and four "sheep and goats" elements 23LL, 23LR, 23RL and 23RR. The first order bit balancer 21, like bit balancer 11 described above in connection with FIG. 1, divides the bits in bit positions Dn of operand data word into bits in bit positions DLn and DRn of left and right data words, respectively, based on the enumeration of the mask bits from the left and right ends of the mask word respectively, and provides the left and right data words, along with respective mask bits, to the second order bit balancers 22L and 22R.

The second order bit balancers 22L and 22R further decompose the bits of the left and right data words into bits in bit positions DLLn, DLRn, DRLn and DRRn of left-left, left-right, right-left and right-right data words, respectively, each comprising N/4 bits, and associated mask bits in bit positions MLLn, MLRn, MRLn and MRRn. Operations performed by the second-order bit balancers 22L and 22R are the same as those performed by the first-order bit balancer 21, except that the second-order bit balancers 22L and 22R perform those operations on N/2 bits. The data bits and associated mask bits are processed by respective "sheep and goats" elements 23LL, 23LR, 23RL and 23RR, respectively, and the results merged to form the bits in bit positions Zn of the output data word.

The strategy used in merging the outputs of the "sheep and goats" elements 23LL, 23LR, 23RL and 23RR of functional unit 20 is similar to that used in merging the "sheep and goats" elements 12L and 12R of functional unit 10. In particular, the functional unit 20 essentially interleaves the outputs, so that the left-most bit of the left-left "sheep and goats" element 23LL is the left-most output data bit in bit position Z0, the left-most bit of the right-left "sheep and goats" element 23RL is the second left-most output data bit in bit position Z1, the left-most bit of the left-right "sheep and goats" element 23LR is the third output data bit in bit position Z2 and the left-most bit of the right-right "sheep and goats" element 23LR is the fourth data bit in bit position Z3, and so forth. This provides the appropriate order for the output data word since (i) the data bit of the operand data word that is associated with left-most clear mask bit (if any) is provided by the first-order bit balancer 21 to the left second-order bit balancer 22L as the left-most bit in bit position DL0 of the left data word, and by the left second-order bit balancer 22L to the left-left "sheep and goats" element 23LL as the left-most bit in bit position DLL0 of the left-left data word, (ii) the data bit of the operand data word that is associated with second left-most clear mask bit (if any) is provided to the right second order bit-balancer 22R as the left-most bit in bit position DR0 of the right data word, and by the right second-order bit balancer 22R to the right-left "sheep and goats" element 23RL as the left-most bit in bit position DLL0 of the left-left data word, (iii) the data bit of the operand data word that is associated with third left-most clear mask bit (if any) is provided by the first-order bit balancer 21 to the left second-order bit balancer 22L as. the second left-most bit in bit position DL1 of the left data word, and by the left second-order bit balancer 22L to the left-right "sheep and goats" element 23LL as the left-most bit in bit position DLR0 of the left-right data word, (iv) the data bit of the operand data word that is associated with fourth left-most clear mask bit (if any) is provided to the right second order bit-balancer 22R as the second left-most bit in bit position DR1 of the right data word, and by the right second-order bit balancer 22R to the right-right "sheep and goats" element 23RL as the second left-most bit in bit position DRR0 of the right-right data word, and so forth, and conversely from the right ends of the respective data words for those bits in bit positions Dn of the operand data word which are associated with set mask bits in bit positions Mn.

In FIG. 3, functional unit 30 comprises a first order bit balancer 21, two second order bit balancers 22L and 22R, and, instead of the four "sheep and goats" elements 23LL, 23LR, 23RL and 23RR, one or more further orders of bit balancers. The number of orders, or stages, of bit balancers will generally depend on the number "N" data bits comprising the operand data word. Generally, if, as is the case with the bit balancers described herein, each bit balancer decomposes the data word input thereto into two "left" and "right" data words, then there will be $Log_2N$ stages, with successive stages comprising $2^0, 2^1, \ldots, 2^{(Log N)-1}$ bit balancers. In the illustrative embodiment depicted in FIG. 3, "N" equals sixteen, and so there are four stages comprising, successively, one, two, four and eight bit balancers. The first order bit balancer 31, like bit balancers 11 and 21 described above in connection with FIGS. 1 and 2, divides the bits in bit positions Dn of operand data word into bits in bit positions DLn and DRn of left and right data words, respectively, based on the enumeration of the mask bits from the left and right ends of the mask word respectively, and provides the left and right data words, along with respective mask bits, to the second order bit balancers 32L and 32R.

The second order bit balancers 32L and 32R further decompose the bits in bit positions DLn and DRn of the left and right data words into bits in bit positions DLLn, DLRn, DRLn and DRRn of left-left, left-right, right-left and right-right data words, respectively, each comprising N/4 bits, and associated mask bits in bit positions MLLn, MLRn, MRLn and MRRn. Operations performed by the second-order bit balancers 32L and 32R are the same as those performed by the first-order bit balancer 31 (and by second-order bit balancers 22L and 22R in functional unit 20), except that the second-order bit balancers 32L and 32R perform those operations on N/2 bits.

The third order bit balancers 33LL, 33LR, 33RL and 33RR further decompose the bits in bit positions DLLn, DLRn, DRLn and DRRn of left-left, left-right, right-left and right-right data words, respectively, into bits in bit positions DLLLn, DLLRn, . . . ,DRRLn, DRRRn of respective left-left-left, left-left-right, . . . , right-right-left, and right-right-right data words (eight in total) each comprising N/8 bits, and associated mask bits in bit positions MLLn, MLRn, MRLn and MRRn. Operations performed by the third-order bit balancers 33LL, 33LR, 33RL and 33RR are the same as those performed by the other bit balancers, as described above, except that the third-order bit balancers perform those operations on N/4 bits.

Finally, the fourth-order bit balancers 34LLL through 34RRR further decompose the bits in bit positions DLLLn, . . . , DRRRn into, respectively, into words DLLLLn, DLLLRn, . . . , DRRRLn, DRRRRn data words (sixteen in total), each comprising N/16 bits, and associated mask bits. For "N," the number of bits in the operand data word, it will be appreciated that each "word " DLLLLn, . . . , DRRRRn actually comprises one bit. The bits from the fourth-order bit balancers 34LLL through 34RRR are merged to form the bits in bit positions Zn of the output data word.

The strategy used in merging the outputs of the fourth-order bit balancers 34LLL through 34RRR of functional unit 30 is similar to that used in merging the "sheep and goats" elements 12L and 12R of functional unit 10 and 23LL through 23RR of functional unit 10. In particular, the functional unit 30 essentially interleaves the outputs, so that (i) the left-most bit of the left-left-left bit-balancer 34LLL is the left-most output data bit in bit position Z0, (ii) the left-most bit of the right-left-left bit balancer 34RLL is the second left-most output data bit in bit position Z1, (iii) the left-most bit of the left-right-left bit balancer 34LRL is the third output data bit in bit position Z2, (iv) the left-most bit of the right-right-left bit balancer 34LRL is the fourth output data bit in bit position Z3, (v) the left-most bit of the left-left-right bit balancer 34LLR is the fifth output data bit in bit position Z4, (vi) the left-most bit of the right-left-right bit balancer 34LRL is the sixth output data bit in bit position Z5, (vii) the left-most bit of the left-right-right bit balancer 34LRR is the seventh output data bit in bit position Z6, (viii) the left-most bit of the right-right-right bit balancer 34RRR is the eighth output data bit in bit position Z7, and so forth for output data bits in bit positions Z8 through Z15. It will be appreciated by those skilled in the art that this interleaving pattern provides the appropriate output data bits in bit positions Zn using the same analysis described above in connection with functional units 10 and 20.

Figure 4A:
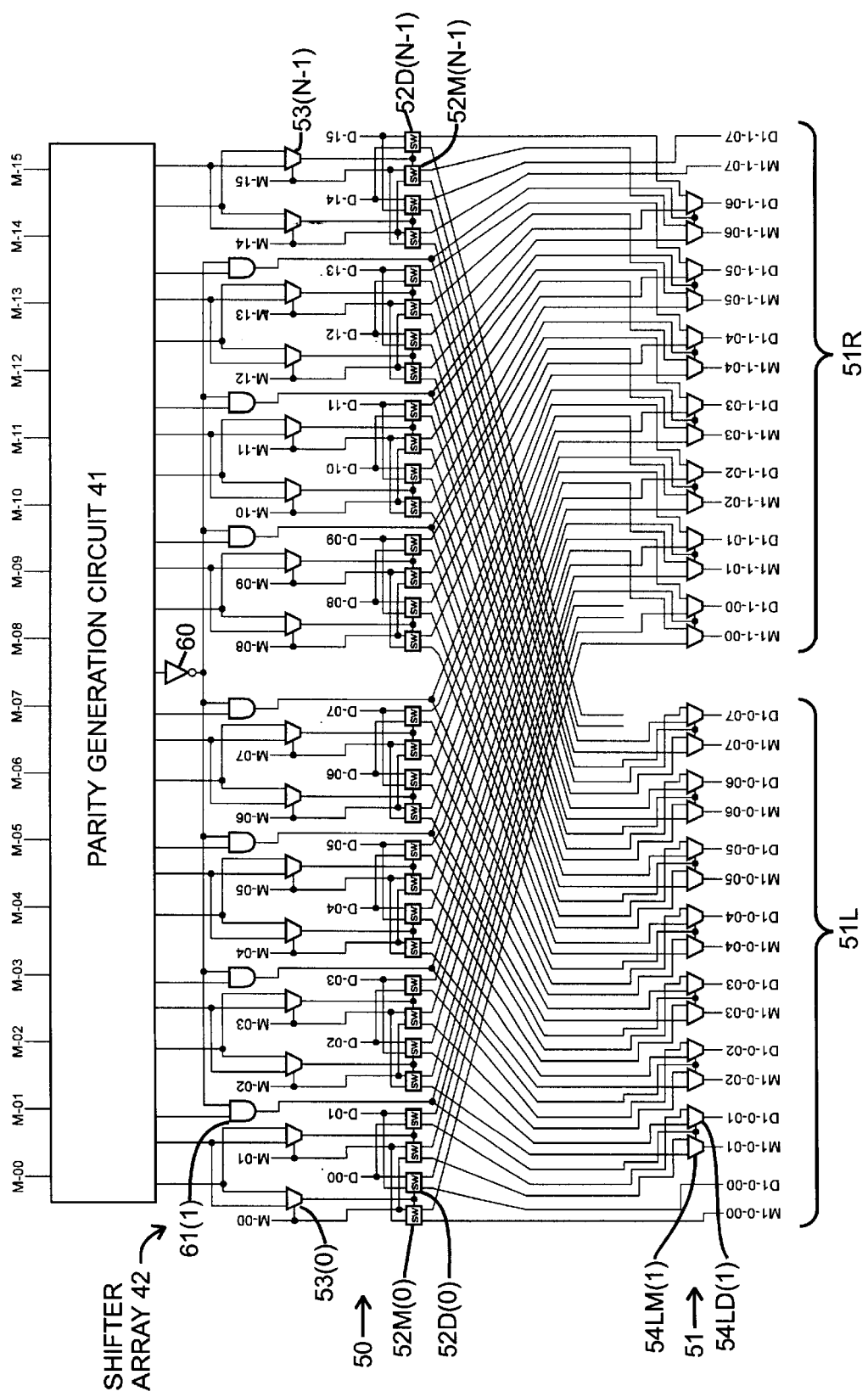
FIGS. 4A and 4B together depict a logic diagram of a bit balancer element used in the functional unit described in connection with FIGS. 1 through 3.
Figure 4B:
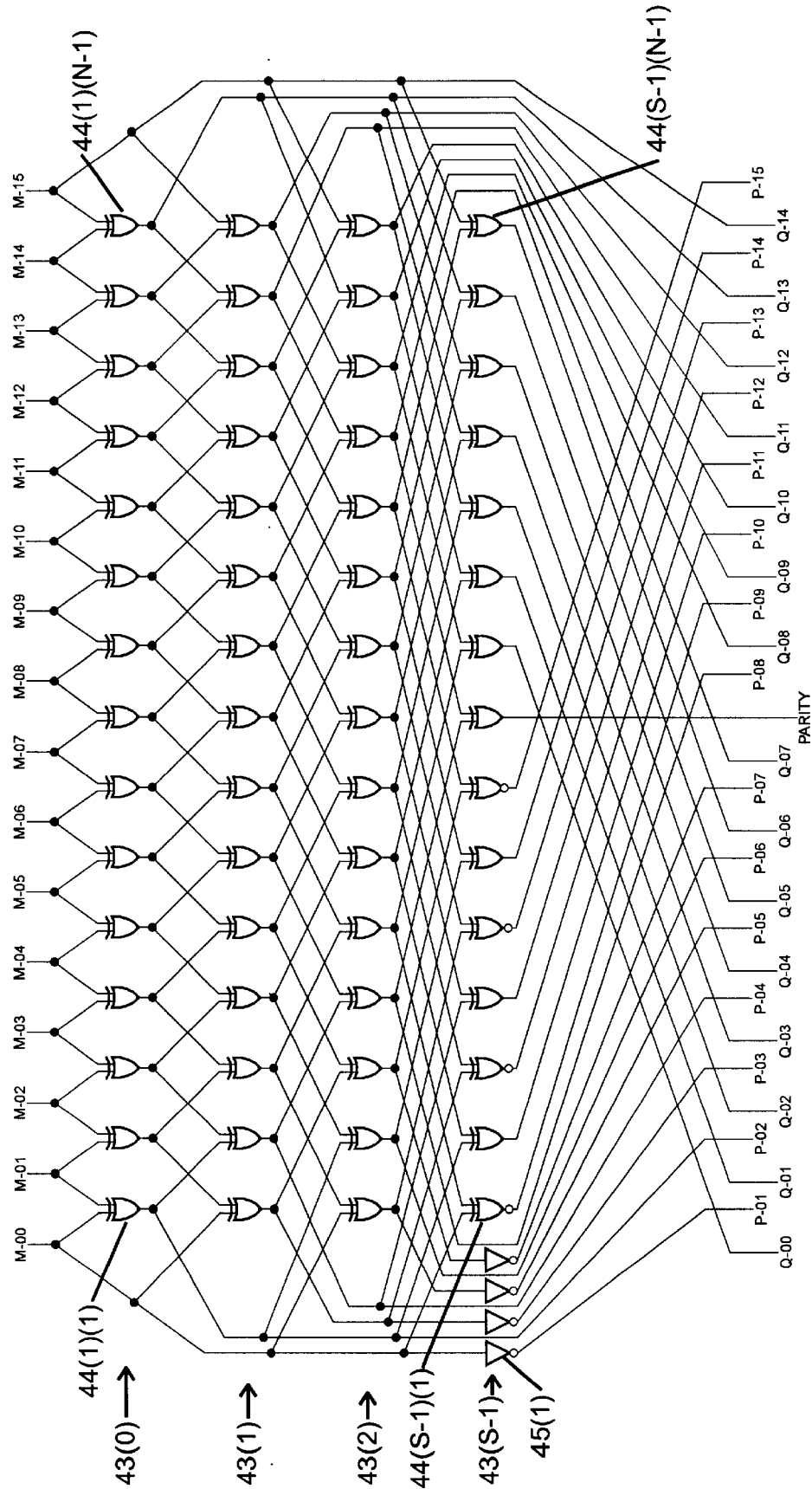

FIGS. 4A and 4B together depict a logic diagram of a bit balancer 40 used in the functional unit described in connection with FIGS. 1 through 3. Generally, the bit balancer 40 depicted in FIGS. 4A and 4B is for use in connection with a sixteen bit data word (N=16) comprising bits in bit positions Dn, and an associated mask word comprising bits in bit positions Mn. Preliminarily, it should be noted that the decomposition performed by the bit balancers is to divide the bits in bit positions Dn of the input data word into bits in bit positions $DLn_L$ and $DRn_R$ of the left and right data words in a regular manner, preserving order, which left and right data words can then be processed as described above, with the result being merged in a regular manner based on the order in which the original data word was decomposed. Accordingly, if, for example, the number of mask bits which are set is odd, for the pair of successive bits in bit positions Dn and Dn+1, for "n" an even number, the bits of the bit pair can be assigned to bits in bit positions $DLn_L$ and $DLn_R$ where both $n_L$ and $n_R$ equal n/2. This is illustrated by the following example (which is similar to the example above, except that the mask bit in bit position M1 is clear instead of set):

be associated with even and odd enumeration values for the same mask bit value, they will be associated with the different output words. In addition, this only occurs if the number of bit pairs Dn, Dn+1 for which the states of the mask bits in bit positions Mn, Mn+1 differ is even, since that will ensure that, for at least one bit pair Dn, Dn+1 for which the associated mask bits in bit positions Mn, Mn+1 are the differ, one of the enumerations for the mask bits will be odd and the other enumeration will be even, thereby providing that both would be associated with the left data word or the right data word.

| 0 | 1 | 2 | 3 | 4 | 5 | 6 | 7 | 8 | 9 | 10 | 11 | 12 | 13 | 14 | 15 | (bit position n) |
|---|---|---|---|---|---|---|---|---|---|----|----|----|----|----|----|------------------|
| 0 | 0 | 1 | 0 | 0 | 0 | 0 | 1 | 0 | 1 | 0  | 0  | 1  | 0  | 1  | 0  | (mask word) |
| 0 | 1 |   | 2 | 3 | 4 | 5 |   | 6 |   | 7  | 8  |    | 9  |    | 10 | (clear bit enumeration) |
|   |   | 4 |   |   |   |   | 3 |   | 2 |    |    | 1  |    | 0  |    | (set bit enumeration) |
| 0 |   | 1 |   | 2 |   | 3 | 4 |   |   | 5  | 6  |    |    |    | 7  | (left output word $n_L$) |
|   | 0 | 1 |   | 2 |   | 3 |   |   | 4 | 5  |    |    | 6  | 7  |    | (right output word $n_R$) |
| a | b | c | d | e | f | g | h | i | j | k  | l  | m  | n  | o  | p  | (data bit value) | showing that, for, for example, bit positions D0 and D1 (the pair of successive bits for which n=0), the enumeration values are "0" (mask bit clear) and "1" (mask bit clear) respectively, for bit positions D2 and D3 (the pair of successive bits for which n=2), the enumeration values are "4" (mask bit set) and "2" (mask bit clear), respectively, and so forth. Thus, the bit balancer 40 will couple the bit "a" in bit position D0 at its input to bit position DL0 of the output, and the bit "b" in bit position D1 at its input to bit position DR0 of the output. Similarly, the bit balancer 40 will couple the bit "c" in bit position D2 to bit position DR1 of the output and the bit "d" in bit position D3 at its input to bit position DL1 of the output.

However, a problem arises with this bit assignment strategy if the number of mask bits which are set is even. This will be illustrated by the following, which corresponds to the first example above:

However, it should be noted that this problem can be alleviated, since
(i) both bits of the D0 and D1 bit pair are to be assigned to the left output word, neither will be used for the bit DR0 of the right output data word, and
(ii) both bits of the D2 and D3 bit pair are to be assigned to the right output word, neither will be used for the bit in bit position DL1 of the left output data word, which would be the case if the bits of a bit pair are assigned to the output bits in bit positions $DLn_r$ and $DLn_L$ for $n_L$, $n_R$=n/2. In that case, by "sliding" bit in bit position D1 onto the bit in bit position DL1 of the left output data word and bit in bit position D2 onto the bit in bit position DR0 of the right output data word, the problem can be alleviated. This occurs whenever the problem arises. The problem only arises if an even number of bits of the mask word are set, and only for bit pairs Dn, Dn+1 for which the number of mask bits in bit positions Mn+1, . . . ,MN−1 which are set is even. In addition, the problem can always be corrected by sliding

| 0 | 1 | 2 | 3 | 4 | 5 | 6 | 7 | 8 | 9 | 10 | 11 | 12 | 13 | 14 | 15 | (bit position Dn) |
|---|---|---|---|---|---|---|---|---|---|----|----|----|----|----|----|-------------------|
| 0 | 1 | 1 | 0 | 0 | 0 | 0 | 1 | 0 | 1 | 0  | 0  | 1  | 0  | 1  | 0  | (mask word) |
| 0 |   |   | 1 | 2 | 3 | 4 |   | 5 |   | 6  | 7  |    | 8  |    | 9  | (clear bit enumeration) |
|   | 5 | 4 |   |   |   |   | 3 |   | 2 |    |    | 1  |    | 0  |    | (set bit enumeration) |
| 0 | 1 |   |   | 2 |   | 3 | 4 |   |   | 5  |    | 6  | 7  |    |    | (left output word $n_L$) |
|   |   | 0 | 1 |   | 2 |   |   | 3 | 4 |    | 5  |    |    | 6  | 7  | (right output word $n_R$) |
| a | b | c | d | e | f | g | h | i | j | k  | l  | m  | n  | o  | p  | (bit value) |

50

In this example, at least some of the bit pairs Dn, Dn+1 (for "n" an even number) would be coupled to the same output bit positions if the bits of a bit pair are assigned to the output bits in bit positions $DLn_r$ and $DLn_L$ for $n_L$, $n_R$=n/2. For example, since the bits "a" and "b," comprising bit pair D0 and D1, are both indicated as comprising bits of the left output word, a problem will arise since, using this bit assignment strategy, they would both be coupled onto the same DL0 bit of the left output data word. Similarly, the bits "c" and "d," comprising bit pair D2 and D3, are both indicated as comprising bits of the right output data word, they would be coupled onto the same DR1 bit of the right output data word. It should be noted that this can only occur if the states of the mask bits in bit positions Mn, Mn+1 associated with a data bit pair Dn, Dn+1 differ, since if the mask bits in bit positions Mn, Mn+1 are the same, they will bits to the right in the left output word and to the left in the right output word, in which case no sliding is required for the left-most bit in bit position DL0 of the left output word or the right-most bit in bit position DR7 of the right output word.

With this background, the bit balancer 40 will be described in connection with FIGS. 4A and 4B. FIG. 4A depicts a logic diagram circuit for the bit balancer 40. Bit balancer 40 generally includes a parity generation circuit 41 and a shifter array 42. The parity generation circuit 41, a detailed logic diagram of which is depicted in FIG. 4B, generates, for each bit position Mn, n=1, . . . ,N−1, a signal Pn indicating whether the number of mask bits in bit positions M0, . . . ,Mn−1 which are clear is odd or even, and, for each bit position Mn, n=0, . . . ,N−2, a signal Qn indicating whether the number of mask bits in bit positions Mn+1, . . . ,MN−1 which are set is odd or even. In each case, the signal Pn or Qn is asserted if the number of mask bits which are clear (in the case of signal Pn) or set (in the case of signal Qn) is odd, and is otherwise negated. In addition, the parity generation circuit 41 generates a PARITY signal which is asserted if the total number of mask bits which are set is odd, and otherwise negated.

Generally, the parity generation circuit 41 generates the Pn, Qn and PARITY signals in a plurality of stages 43(0) through 43(S−1) (generally identified by reference numeral 43(s)), where "S" corresponds to $\text{Log}_2 N$; since, in the illustrative embodiment described in connection with FIGS. 4 and 4B, "N" corresponds to sixteen, "S" corresponds to four. Each stage, in turn, comprises an array of XOR gates 44(s)(1) though 44(s)(N−1) (generally, 44(s)(n)). In the first stage, each XOR gate receives input signals Mn−1 and Mn and generates an asserted output signal if one, but not both, of the input signals is asserted. Each signal Mn−1 and Mn represents the state of the mask bits in bit positions Mn−1 and Mn of the mask word, and is asserted if the state of the mask bit is set and negated if it is clear. Accordingly, each XOR gate 44(0)(n) in the first stage 43(0) generates an asserted signal if one or the other, but not both, of the input signals is asserted. Thus, if the XOR gate 44(0)(n) generates an asserted signal, an odd number of mask bits in bit positions Mn and Mn−1 will be set, but if the XOR gate 44(0)(n) generates a negated signal, an even number of mask bits in bit positions Mn and Mn−1 will be set. Since XOR gate 44(0)(1) in the first stage 43(n) receives signals M0 and M1 representing the states of the similarly-named mask bits in bit positions M0 and M1, its output will indicate whether the number of mask bits in bit positions M0 and M1 is even or odd. This, in turn, indicates whether the number of mask bits to the left of bit position M2 is even or odd, and thus comprises the P2 signal. Similarly, the output of XOR gate 44(0)(15) in the first stage 43(1) indicates whether the number of mask bits to the right of bit position MN−3 is even or odd, and thus comprises the Q13 signal. It will be appreciated that the complement of the M0 signal, generated by an inverter 45(1) indicates whether the number of clear mask bits to the left of bit position M1 is even or odd, and thus comprises the P1 signal, and the M15 signal indicates whether the number of mask bits to the right of set bit position M14 is even or odd, and thus comprises the Q14 signal.

Each XOR gate 44(1)(n) in the second stage receives signals from the XOR gates 44(0)(n−1) and 44(0)(n+1) in the preceding stage (if one exists; for XOR gates 44(1)(1) and 44(1)(15), they instead receive the M0 and M15 signals) and generates in response an output that indicates whether the number of bits in overlapping series of four bit positions Mn−2, . . . Mn+1 (if they exist) is odd or even. Thus, XOR gate 44(1)(1) receives a signal from XOR gate 44(0)(1) which, if asserted, indicates that an odd number of mask bits in bit positions M1 and M2 are set, and if negated, indicates that an even number of the mask bits are set. The XOR gate 44(1)(1) also receives the M0 signal which, if set, indicates that mask bit in bit position M0 is set, and if negated, indicates mask bit in bit position M0 is clear. Thus, if an even number of mask bits in bit positions M0 through M2 are set, both the M0 signal and the signal from XOR gate 44(0)(2) will be asserted, in which case the XOR gate 44(1)(1) will generate a negated signal. On the other hand, if an odd number of mask bits in bit positions M0 through M2 are set, one or the other, but not both, of the M0 signal and the signal from the XOR gate 44(0)(2) will be asserted, in which case the XOR gate 44(1)(1) will generate an asserted signal. It will be appreciated that the output of the XOR gate 44(1)(1) will indicate whether the number of mask bits to the left of bit position M3 which are set, and thus the complement of the output of the XOR gate 44(1)(1) comprises the P3 signal. Similarly, the outputs of the XOR gates 44(1)(2), 44(1)(14) and 44(1)(15) comprise the P4, Q11 and Q12 signals, respectively.

Each XOR gate 44(2)(n) in the third stage receives signals from the XOR gates 44(1)(n−2) and 44(0)(n+2) in the preceding stage (if one exists; for XOR gates 44(2)(1) and 44(2)(15) they instead receive the M0 and M15 signals, respectively, and for XOR gates 44(2)(2) and 44(2)(14) they instead receive the signals generated by XOR gates 44(0)(1) and 44(0)(15), respectively) and generates in response an output that indicates whether the number of bits in overlapping series of eight bit positions Mn−4, . . . Mn+3 (if they exist) is odd or even. Similarly, each XOR gate 44(3)(n) in the last stage generates outputs that indicate whether the number of bits in overlapping series of sixteen bit positions Mn−8, . . . ,Mn+7 (if they exist) is odd or even. Accordingly, XOR gate 44(3)(8) generates the PARITY signal, and the other Pn and Qn signals are generated in a manner that will be appreciated by those skilled in the art from the above description.

The Pn, Qn and PARITY signals are used by the shifter array 42 (FIG. 4A) to control the shifting of the data bits in bit positions Dn and associated mask bits in bit positions Dn to the appropriate bit locations $\text{DLn}_L$ and $\text{DRn}_R$ of the left and right data words. With reference to FIG. 4A, the shifter array 42 generally includes a shifter stage 50 and a slider stage 51. The shifter stage 50 serves to shift signals representing each bit pair Dn, Dn+1, and associated mask bits in bit positions Mn, Mn+1, to signals representing the correct output data and associated mask bits in bit positions DLn, MLn, DRn, MRn, for the left and right output words. The slider stage 51 slides the signals, as described above, to ensure that signals of the same bit pair are not coupled as the same output data and mask bit signals of the same left or right data word. In the following, it will be appreciated that the shifter stage 50 uses Pn signals from the parity generation circuit 41 will be used for odd values of "n" and Qn signals for even values of "n," and that the slider stage uses the Qn signals for odd values of "n" and the PARITY signal.

The shifter stage 50 includes a plurality of swap modules 52D(0) through 52D(N−1) and 52M(0) through 52M(N−1). Generally, the swap modules labeled "52D(x)" (where "x" may be an integer from "0" through "N−1") are used in connection with controlling the coupling of the data bits pairs Dn, Dn+1 to respective left and right sets of sliders 51L and 51R in the slider stage 51, and the swap modules labeled 52M(x) are used in connection with controlling the coupling of the associated mask bits thereto. Each set of four swap modules 52D(n), 52D(n+1), 52M(n), 52M(n+1), for "n" an even integer, controls the coupling of signals representing the data bit pairs Dn, Dn+1 and associated mask bits in bit positions Mn; Mn+1, to the respective sliders sets 51L and 51R in the slider stage 51. Each pair of swap modules 52D(n) and 52M(n) (for "n" any integer from "0" through "N−1") is controlled by one of the output signals generated by the parity generation circuit 41 as selected by a multiplexer 53(n) which, in turn, is controlled by a signal representing the associated bit in bit position Mn of the mask word. The multiplexer 53(n) selects one of the Px or Qy signals provided by the parity generation circuit 41 to control the respective pair of swap modules 52D(n) and 52M(n).

The slider stage 51 includes a plurality of multiplexers 54LD(1) through 54LD(N/2−1) (generally, 51LD(n)), 54LM

(1) through 54LM(N/2−1) (generally, 51LM(n)), 54RD(Q) through (54RD(N/2−1) (generally, 54RD(n)) and 54RM(0) through 54RM(N/2−1) (generally 54RM(n)). Multiplexers 54LD(n) and 54LM(n) are associated with the left data word and serve to slide the data bits (in the case of multiplexers 51LD(n)) and associated mask bits (in the case of multiplexers 51LM(n)) to the right as necessary, and multiplexers 51RD(n) and 51RM(n) are associated with the right data word and serve to slide the data bits (in the case of multiplexers 51RD(n)) and associated mask bits (in the case of multiplexers 51RM(n)) to the left as necessary. Each multiplexer 54LD($n_L$) ($n_L$=1, . . . ,N/2−1) is connected to two swap modules 52D(n+1) and 52D(n+2) (n=2)($n_L$−1)) in the shifter stage 50 to facilitate the selective coupling of the output signal from one of swap module 52D(n−1) or 52D(n) as the respective output signal representing bit in bit position $Dn_L$ of the left data word. It will be appreciated that, if the multiplexer 54LD($n_L$) couples the output signal from swap module 52D(n+2) as the signal representing bit in bit position $Dn_L$ of the left data word, the multiplexer 54LD($n_L$) will not be performing sliding. On the other hand, if the multiplexer 54LD($n_L$) couples the output signal from swap module 52D(n+1) as the signal representing bit in bit position $Dn_L$ of the left data word, the multiplexer 54LD($n_L$) will be performing sliding, to slide the signal that would otherwise be coupled by the slider stage 51 as the signal representing data bit in bit position $Dn_L$−1 of the left data word as data bit in bit position $Dn_L$. Multiplexer 54LM($n_L$) operates similarly in connection with signals from the swap modules 52M(n−1) and 52M(n) to provide the appropriate mask bit in bit position Mn+2 (no sliding) or Mn+1 (sliding) as the mask bit in bit position $Mn_L$. Since no shifting is performed in connection with the data bit in bit position D0 of the left data word, no multiplexers are provided therefor; the outputs of the swap modules 52D(0) and 52M(0) provide the data and mask bits in bit positions D0 and M0 of the left data word.

Similarly, each multiplexer 54RD($n_L$) ($n_L$=0, . . . ,N/2−2) is connected to two swap modules 52D(n) and 52D(n+2) (n=(2$n_R$) in the shifter stage 50 to facilitate the selective coupling of the output signal from one of swap module 52D(n) or 52D(n+2) as the respective output signal representing bit in bit position $Dn_R$ of the right data word. It will be appreciated that, if the multiplexer 54RD($n_R$) couples the output signal from swap module 52D(n) as the signal representing bit in bit position $Dn_R$ of the right data word, the multiplexer 54RD($n_R$) will not be performing sliding. On the other hand, if the multiplexer 54RD($n_R$) couples the output signal from swap module 52D(n+2) as the signal representing bit in bit position $Dn_R$ of the right data word, the multiplexer 54RD($n_R$) will be performing sliding, to slide the signal that would otherwise be coupled by the slider stage 51 as the signal representing data bit in bit position $Dn_R$+1 of the right data word as data bit in bit position $Dn_R$. Multiplexer 54RM($n_R$) operates similarly in connection with signals from the swap modules 52M(n) and 52M(n+2) to provide the appropriate mask bit in bit position Mn (no sliding) or Mn+2 (sliding) as the mask bit in bit position $Mn_R$.

As noted above, the slider stage 51 performs sliding in connection with a data bit pair Dn, Dn+1 only occur if the states of the mask bits in bit positions Mn, Mn+1 associated with a data bit pair Dn, Dn+1 differ, and then only if the number of bit pairs Dn, Dn+1 for which the states of the mask bits in bit positions Mn, Mn+1 differ is even. If the latter condition is satisfied, the PARITY signal will be negated. If the former condition is satisfied for a bit pair Dn and Dn+1, the number of mask bits in bit positions Mn+2, . . . , MN−1 to the right of the positions of bit pair Dn, Dn+1 which are set will be odd, and so the Qn+1 signal from the parity generation circuit 41 will be asserted. The slider stage 51 is provided with an inverter 60 and a plurality of AND gates 61(1) through 61(N/2−1) (generally 61(n)). The inverter 60 provides to each AND gate 61(n) an asserted signal if the PARITY signal is negated and a negated signal if the PARITY signal is asserted, thereby energizing one input of each AND gate 61(n) if the number of bit pairs Dn, Dn+1 for which the states of the mask bits in bit positions Mn, Mn+1 differ is even. Each AND gate 61(n) also receives the Q2n−1 signal from the parity generation circuit 41 and generates an asserted output signal if both the signal from the inverter 60 is asserted and the Q2n−1 signal from the parity generation circuit 41 is asserted. When that occurs, it will be appreciated that both the conditions are satisfied. The output of each AND gate 61(n) is used to control the pairs of multiplexers 54LD(n) and 54LM(n) and 54RD(n−1) and 54RM(n−1) used to provide the respective output data bits of the left and right data words.

A description of the operation of the shifter array 42 in connection with the bit pair D0, D1, and associated mask bits in bit positions M0, M1, will serve to illustrate the operation of the shifter array 42 for the other bit pairs. It will be appreciated that there are several scenarios at both the shift stage 50 and the slider stage 51, including (i) mask bits in bit positions M0 and M1 both clear, (ii) mask bits in bit positions M0 and M1 both set and (a) the PARITY signal is negated or (b) the PARITY signal is asserted, (iii) mask bit in bit position M0 clear and mask bit in bit position M1 set, and (a) AND gate 61(1) is generating a negated signal or (b) AND gate 61(1) is generating an asserted signal, and (iv) mask bit in bit position M0 set and mask bit in bit position M1 clear and (a) AND gate 61(1) is generating a negated signal or (b) AND gate 61(1) is generating an asserted signal. It will be appreciated that AND gate 61(1) will be generating a negated signal either if the PARITY signal is asserted, indicating that the number of mask bits which are set is odd, or if the Q1 signal is negated, indicating that the number of mask bits to the right of bit position M1 which are set is even.

(i) Mask bits in bit positions M0 and M1 are both clear

Swap modules 52D(0) and 52D(1) both receive at their inputs the signals representing the data bit pair D0 and D1, and swap modules 52M(0) and 52M(1) both receive at their inputs the signals representing the associated mask bits in bit positions M0 and M1. Since the mask bit in bit position M0 is clear, the multiplexer 53(0) will be enabled to couple the P1 signal to the swap modules 52D(0) and 52M(0). Similarly, since the mask bit in bit position M1 is clear, the multiplexer 53(1) will also be enabled to couple the P1 signal to the swap modules 52D(1) and 52M(1). If the P1 signal is asserted (which, as noted above, will be the case since the M0 mask bit is clear), the swap modules 52D(0) and 52M(0) will be enabled to couple the D0 data bit and associated M0 mask bit as the DL(0) bit of the left data word and associated ML(0) mask bit. In addition, the swap modules 52D(1) and 52M(1) will be enabled to couple the D1 data bit and associated M1 mask bit to the multiplexers 54RD(0) and 54RM(0) in the slider stage 51. Since both the PARITY and the Q1 signal from the parity generation circuit are negated, the AND gate 61(1) will be generating a negated output signal, which enables the multiplexers 54 RD(0) and 54RM(0) to couple the signals representing the data and mask bits in bit positions D1 and M1 from swap modules 52D(1) and 52M(1) as bit in bit position DR(0) of the right data word and associated mask bit in bit position MR(0).

ii)(a) Mask bits in bit positions M0 and M1 are both set and the PARITY signal is negated Swap modules 52D(0) and 52D(1) both receive at their inputs the signals representing the data bit pair D0 and D1, and swap modules 52M(0) and 52M(1) both receive at their inputs the signals representing the associated mask bits in bit positions M0 and M1. Since the mask bit in bit position M0 is set, the multiplexer 53(0) will be enabled to couple the Q0 signal to the swap modules 52D(0) and 52M(0). Similarly, since the mask bit in bit position M1 is set, the multiplexer 53(1) will also be enabled to couple the Q0 signal to the swap modules 52D(1) and 52M(1). Since the PARITY signal is negated, the total number of mask bits which are set is even, and so the number of mask bits to the right of bit position is M0 will be odd, in which case the Q0 signal will be asserted. In that case, the swap modules 52D(0) and 52M(0) will be enabled to couple the D0 data bit and associated M0 mask bit as the DL(0) bit of the left data word and associated ML(0) mask bit. In addition, the swap modules 52D(1) and 52M(1) will be enabled to couple the D1 data bit and associated M1 mask bit to the multiplexers 54RD(0) and 54RM(0) in the slider stage 51. Since the PARITY signal is negated and the Q1 signal from the parity generation circuit is asserted, the AND gate 61(1) will be generating a negated output signal, which enables the multiplexers 54RD(0) and 54RM(0) to couple the signals representing the data and mask bits in bit positions D1 and M1 from swap modules 52D(1) and 52M(1) as bit in bit position DR(0) of the right data word and associated mask bit in bit position MR(0).

(ii)(b) Mask bits in bit positions M0 and M1 are both set and the PARITY signal is asserted Swap modules 52D(0) and 52D(1) both receive at their inputs the signals representing the data bit pair D0 and D1, and swap modules 52M(0) and 52M(1) both receive at their inputs the signals representing the associated mask bits in bit positions M0 and M1. Since the mask bit in bit position M0 is set, the multiplexer 53(0) will be enabled to couple the Q0 signal to the swap modules 52D(0) and 52M(0). Similarly, since the mask bit in bit position M1 is set, the multiplexer 53(1) will also be enabled to couple the Q0 signal to the swap modules 52D(1) and 52M(1). Since the PARITY signal is asserted, the total number of mask bits which are set is odd, and so the number of mask bits to the right of bit position is M0 will be even, in which case the Q0 signal will be negated. In that case, the swap modules 52D(0) and 52M(0) will be enabled to couple the D1 data bit and associated M1 mask bit as the DL(0) bit of the left data word and associated ML(0) mask bit. In addition, the swap modules 52D(1) and 52M(1) will be enabled to couple the D0 data bit and associated M0 mask bit to the multiplexers 54RD(0) and 54RM(0) in the slider stage 51. Since both the PARITY signal and the Q1 signal from the parity generation circuit are negated, the AND gate 61(1) will be generating a negated output signal, which enables the multiplexers 54RD(0) and 54RM(0) to couple the signals representing the data and mask bits in bit positions D0 and M0 from swap modules 52D(0) and 52M(0) as bit in bit position DR(0) of the right data word and associated mask bit in bit position MR(0).

(iii)(a) mask bit in bit position M0 clear and mask bit in bit position M1 set and AND gate 61(1) is generating a negated signal Swap modules 52D(0) and 52D(1) both receive at their inputs the signals representing the data bit pair D0 and D1, and swap modules 52M(0) and 52M(1) both receive at their inputs the signals representing the associated mask bits in bit positions M0 and M1. Since the mask bit in bit position M0 is clear, the multiplexer 53(0) will be enabled to couple the P1 signal to the swap modules 52D(0) and 52M(0). Since the mask bit in bit position M1 is set, the multiplexer 53(1) will be enabled to couple the Q0 signal to the swap modules 52D(1) and 52M(1). Since the mask bit in bit position M0 is clear, the P1 signal will be asserted, in which case the swap modules 52D(0) and 52M(0) will be enabled to couple the D0 data bit and associated M0 mask bit as the DL(0) bit of the left data word and associated ML(0) mask bit. Since the mask bit in bit position M1 is set and either the PARITY signal is negated or the Q1 signal is negated, the Q0 signal will enable the swap modules 52D(1) and 52M(1) to couple the D1 data bit and associated M1 mask bit to the multiplexers 54RD(0) and 54RM(0) in the slider stage 51. Since either the PARITY signal or the Q1 signal from the parity generation circuit are negated, the AND gate 61(1) will be generating a negated output signal, which enables the multiplexers 54RD(0) and 54RM(0) to couple the signals representing the data and mask bits in bit positions D1 and M1 from swap modules 52D(1) and 52M(1) as bit in bit position DR(0) of the right data word and associated mask bit in bit position MR(0).

(iii)(b) mask bit in bit position M0 clear and mask bit in bit position M1 set and AND gate 61(1) is generating an asserted signal Swap modules 52D(0) and 52D(1) both receive at their inputs the signals representing the data bit pair D0 and D1, and swap modules 52M(0) and 52M(1) both receive at their inputs the signals representing the associated mask bits in bit positions M0 and M1. Since the mask bit in bit position M0 is clear, the multiplexers 53(0) and 53(1) will be enabled to couple the P1 signal to the swap modules 52D(0) and 52M(0). Since the mask bit in bit position M1 is set, the multiplexer 53(1) will be enabled to couple the Q0 signal to the swap modules 52D(1) and 52M(1). Since the mask bit in bit position M0 is clear, the P1 signal will be asserted, in which case the swap modules 52D(0) and 52M(0) will be enabled to couple the D0 data bit and associated M0 mask bit as the DL(0) bit of the left data word and associated ML(0) mask bit. Since the mask bit in bit position M1 is set and both the PARITY signal and the Q1 signal are asserted, the Q0 signal will enable the swap modules 52D(1) and 52M(1) to couple the D1 data bit and associated M1 mask bit to the multiplexers 54LD(0) and 54LM(0) in the slider stage 51. Since both the PARITY signal and the Q1 signal from the parity generation circuit are asserted the AND gate 61(1) will be generating an asserted output signal, which enables the multiplexers 54LD(0) and 54LM(0) to couple the signals representing the data and mask bits in bit positions D1 and M1 from swap modules 52D(1) and 52M(1) as bit in bit position DL(1) of the left data word and associated mask bit in bit position ML(1).

Operations performed in connection with scenarios (iv)(a) and (iv)(b) are complementary to those performed in connection with scenarios (iii)(a) and (iii)(b) and will not be described herein.

Figure 5:
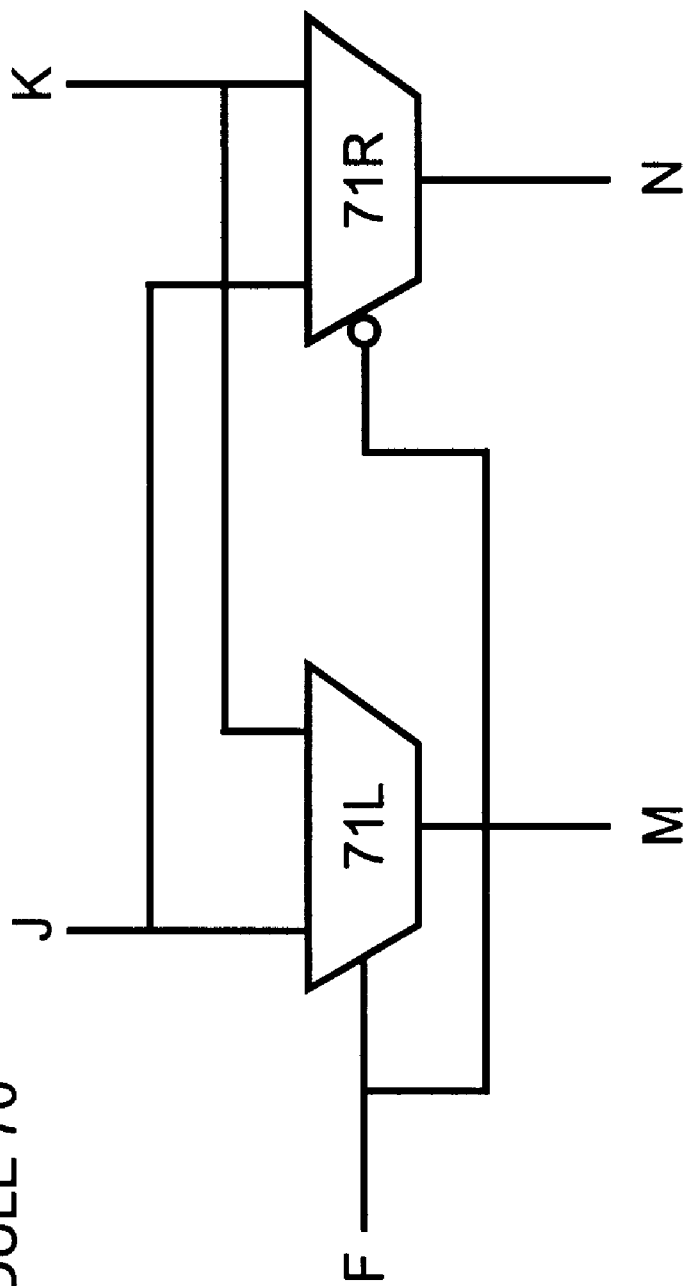
FIG. 5 depicts a schematic diagram of a swapper circuit used in the bit balancer element described in connection with FIGS. 4A and 4B.

FIG. 5 depicts a schematic diagram of a swap module 70 used in the bit balancer element described in connection with FIGS. 4A and 4B. With reference to FIG. 5, swap module 70 comprises two multiplexers 71L and 71R both of which receive input signals J and K and couples one or the other input signal as a respective output signal M and N. Multiplexer 71L operates under control of a control signal F, and multiplexer 71R operates under control of the complement of control signal F. The input signals J and K correspond to the respective signals representing the mask and data bits described above in connection with FIG. 4A, and the control signal F corresponds to the signal provided by the respective multiplexer 51(n). It will be appreciated that, when the control signal F is asserted, multiplexer 71L couples the J input signal as its output signal M and multiplexer 71R couples the K input signal as its output signal N. On the other hand, when the control signal F is negated, multiplexer 71L couples the K input signal as its output signal M and multiplexer 71R couples the J input signal as its output signal N.

The invention provides a number of advantages. In particular, the invention provides a functional unit for efficiently executing a "sheep and goats" instruction, in which bits in bit positions Dn of a data word are rearranged according to bits in bit positions Mn of a mask word, so that all bits in bit positions Dn of the data word are divided into two groups as defined by bits of a mask word, one group (the "sheep") corresponding to those bits for which the bits of the mask word are clear, and the other (the "goats") corresponding to those bits for which the bits of the mask word are set, and in addition preserves order of the data bits in each group.

It will be appreciated that a number of modifications may be made to the functional unit described above in connection with FIGS. 1 and 2. For example, it will be apparent that the functional unit can be readily modified to operate so that the data bits associated with the mask bits which are set are shifted to the left and the data bits associated with the mask bits which are clear are shifted to the right.

Furthermore, although the invention has been described in connection with rearranging portions of a data word comprising single-bit units, each associated with a bit of the mask word, it will be apparent that the invention can be used in connection with rearranging multi-bit data word units, with each unit being associated with a bit of the mask word. In that case, each of the swap modules will receive, instead of a single bit, the corresponding multi-bit portion and provide as an output a corresponding multi-bit portion.

In addition, although the functional unit has been described as rearranging a sixteen bit data word Dn according to the bits of a sixteen bit mask word Mn, it will be appreciated that the functional unit may be extended to rearrange a data word of any size.

Figure 6:
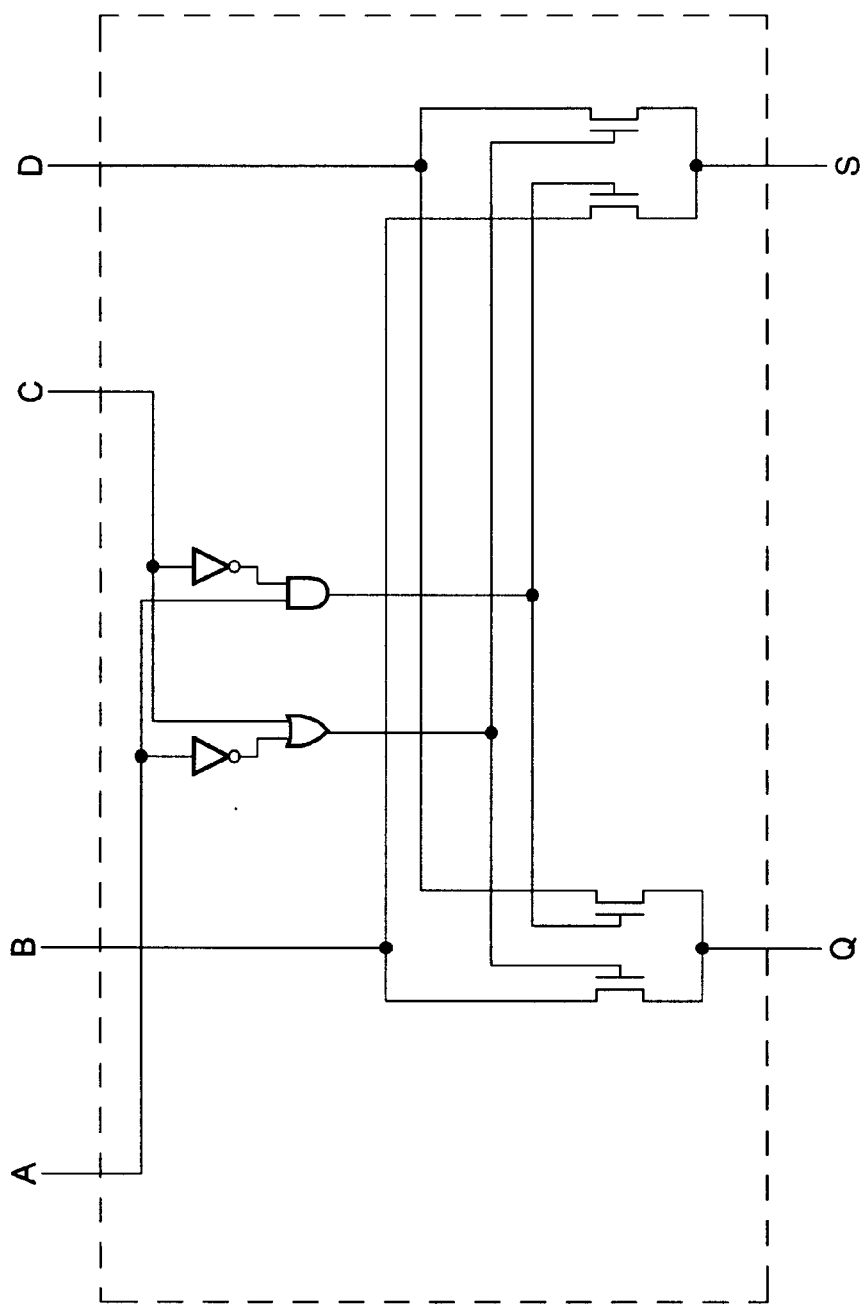
FIG. 6 depicts a schematic diagram of a swapper circuit that may be used in the embodiment of the functional unit depicted in FIG. 3.

In addition, although the functional unit 30 has been described as making use of bit balancers 34LLL, etc., as the last stage of the functional unit, it will be appreciated that swap modules such as the swap module 80 depicted in FIG. 6 may be used. Generally, the swap module 80 receives four input signals identified as A, B, C and D, and generates four output signals identified as P, Q, R and S. With reference to FIG. 3, if a swap module 80 is used instead of bit balaner 34LLL, the input signals A and C are representative of the input mask bits in bit positions MLLL0 and MLLL1, respectively, and input signals B and D are representative of the input data bits in bit positions DLLL0 and DLLL1, respectively, provided by the bit balancer 33LL. Similarly, the output signals P and R are representative of the output mask bits in bit positions MLLLL and MLLLR, respectively, and the output signals Q and S are representative of the output data bits in bit positions DLLLL (which corresponds to the output bit in bit position Z0), and DLLLR (which corresponds to the output bit in bit position Z8).

The swap module 80 generates the output signals P, Q, R and S as follows:

$$P = A \text{ and } C \tag{1}$$

$$Q = ((C \text{ or not-}A) \text{ and } B) \text{ or } ((A \text{ and not-}C) \text{ and } D) \tag{2}$$

$$R = A \text{ or } C \tag{3}$$

$$S = ((C \text{ or not-}A) \text{ or } B) \text{ and } ((A \text{ and not-}C) \text{ or } D) \tag{4}$$

where "and," "or," and "not" refers to the corresponding Boolean logical operation. It will be appreciated that these output signals provide the appropriate signals representative of the desired left and right output data and mask bits in bit positions $D_0n$, $D_0n+1$, M'n and M'n+1 since:

(i) the output signal P, representative of the left output mask bit in bit position M'n, will (from (1)) be
  (a) negated, representative of a clear output mask bit in bit position M'n, if one or both of the input signals A and C, representative of the left and right input mask bits in bit positions Mn and Mn+1, are negated, thereby indicating that one or both of the left and right input mask bits is clear, or
  (b) asserted, representative of a set output mask bit in bit position M'n, only if both of the input signals A and C are asserted, thereby indicating that both of the left and right input mask bits are set, (ii) the output signal R, representative of the right output mask bit in bit position M'n+1, will (from (2)) be
  (a) negated, representative of a clear output mask bit in bit position M'n+1, if both of the input signals A and C are negated, thereby indicating that both of the left and right input mask bits are clear, or
  (b) asserted, representative of a set output mask bit in bit position M'n+1, if one or both of the input signals A and C are asserted, thereby indicating that one or both of the left and right input mask bits are set, (iii) the output signal Q, representative of the left output data bit in bit position $D_0n$, will (from 3)
  (a) correspond to the input signal B, representative of the value of the left input data bit in bit position Dn, if the input signal A is negated, indicating that the left mask bit in bit position Mn is clear, or if the input signal C is asserted, indicating that the right mask bit in bit position Mn+1 is set, and
  (b) correspond to the input signal D, representative of the value of the right input data bit in bit position Dn+1, if both the input signal A is asserted and the input signal C is negated, indicating both that the left mask bit in bit position Mn is set and that the right mask bit in bit position Mn+1 is clear, and (iv) the output signal S, representative of the right output data bit in bit position $D_0n+1$ will (from (4))
  (a) correspond to the input signal D, representative of the value of the right input data bit in bit position Dn+1, if the input signal C is asserted or the input signal A is negated, indicating that either the right mask bit in bit position Mn+1 is set or the left mask bit in bit position Mn is clear, and
  (b) correspond to the input signal B, representative of the value of the left input data bit in bit position Dn, if both the input signal A is asserted and the input signal C is negated, indicating both that the left mask bit in bit position Mn is set and that the right mask bit in bit position Mn+1 is clear.

From (4) the output signal S also corresponds to the logical OR of the signal described above in connection with (iv)(a) and (iv)(b) and
  (c) a signal corresponding to the logical "and" of one composite signal corresponding to the logical "or" of the input signal C and the complement of the input signal A, on the one hand, and another composite signal corresponding to the logical "and" of the input signal A and the complement of the input signal C, but it will be appreciated that the two composite signals are complements of each other and thus the logical "and" of them will always be negated, and (d) a signal corresponding to the logical "and" of the B and D input signals, but it will be appreciated that this signal would be asserted only if both the B and D input signals are asserted and so this signal will be asserted only if one of the signals identified above in connection with (iv)(a) or (iv)(b) is asserted.

FIG. 6 depicts an illustrative logic circuit which generates the outputs P, Q, R and S from inputs A, B, C, and D as described above in connection with (1) through (4). The operation of the logic circuit will be apparent to those skilled in the art and will not be described further herein.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A system for providing, from an input data word comprising a plurality of input data units having an input arrangement and a mask word comprising a plurality of mask bits each associated with one of said data units, an output data word in which the data units are arranged according to the mask bits, the system comprising:

A. a bit balancer module configured to divide the input data units comprising the input data word into a plurality of data word portions, each data unit being assigned to one of said data word portions based on a pattern of mask bits of the mask word relative to the mask bit associated with the respective data unit; and B. a plurality of rearrangement modules each configured to provide, from one of the data word portions and associated mask bits, an output data word portion in which the data units are arranged according to the mask bits, the data units of the output data word portions provided by the rearrangement modules being interleaved to provide the output data word.

2. A system as defined in claim 1 in which each data unit is a bit.

3. A system as defined in claim 1 in which each mask bit has one of a plurality of conditions, and in which at least one rearrangement module comprises a "sheep and goats" module configured to generate the output data word portion in which the data units in the data word portion that it receives whose associated mask bits have one of said conditions are packed to one end of the output data word portion and data units bits whose associated mask bits have the other of said conditions are packed to another end of the output data word portion.

4. A system as defined in claim 1 in which at least one rearrangement module comprises:

A. a second order bit balancer module configured to divide the data word portion received thereby into a plurality of second order data word portions, each data unit of the data word portion received thereby being assigned to one of said data word portions based on a pattern of mask bits associated with the data units received hereby relative to the mask bit associated with the respective data unit; and B. a plurality of rearrangement modules each configured to provide, from one of the data word portions and associated mask bits, a second order output data word portion in which the data units are arranged according to the mask bits.

5. A system as defined in claim 1 in which each mask bit has one of a plurality of conditions, and in which the bit balancer module is configured to assign one of said data units to one of said data word portions in relation to the condition of the mask bit and an enumeration identifying the number of mask bits having that condition from a respective one of a plurality of ends of the mask word.

6. A system as defined in claim 5 in which said mask word comprises "N" mask bits in bit positions Mn, $n=0,\ldots,N-1$, each associated with one of said data units Dn, each mask bit having one of a plurality of conditions, said bit balancer module comprising:

A. a parity generation module configured to generate, for each bit position Mn, $n=1,\ldots,N-1$, a parity signal Pn indicating whether the number of mask bits in bit positions $M0,\ldots,Mn-1$ which have one of said conditions is odd or even, and, for each bit position Mn, $n=0,\ldots,N-2$, a parity signal Qn indicating whether the number of mask bits in bit positions $Mn+1,\ldots,MN-1$ which have another of said conditions is odd or even, and a parity signal PARITY indicating wither the total number of mask bits which have the other of said conditions set is odd, and B. a shifter array configured to shift the data units and associated mask bits to appropriate locations in respective ones of said data unit portions in response to the parity signals Pn and Qn and said parity signal PARITY.

7. A method of providing, from an input data word comprising a plurality of input data units having an input arrangement and a mask word comprising a plurality of mask bits each associated with one of said data units, an output data word in which the data units are arranged according to the mask bits, the method comprising the steps of:

A. dividing the input data units comprising the input data word into a plurality of data word portions, each data unit being assigned to one of said data word portions based on a pattern of mask bits of the mask word relative to the mask bit associated with the respective data unit; and B. providing, from each of the data word portions and associated mask bits, an output data word portion in which the data units are arranged according to the mask bits, and C. interleaving the data units of the output data word portions to provide the output data word.

8. A method as defined in claim 7 in which each mask bit has one of a plurality of conditions, the output data word portion providing step including the step of generating the output data word portion in which the data units in the data word portion that it receives whose associated mask bits have one of said conditions are packed to one end of the output data word portion and data units bits whose associated mask bits have the other of said conditions are packed to another end of the output data word portion.

9. A method as defined in claim 7 in which at least one output data word providing step includes:
   A. dividing the data word portion received thereby into a plurality of second order data word portions, each data unit of the data word portion received thereby being assigned to one of said data word portions based on a pattern of mask bits associated with the data units received hereby relative to the mask bit associated with the respective data unit; and
   B. providing, from one of the data word portions and associated mask bits, a second order output data word portion in which the data units are arranged according to the mask bits.

10. A method as defined in claim 7 in which each mask bit has one of a plurality of conditions, and in which the input data unit dividing step includes the step of assigning one of said data units to one of said data word portions in relation to the condition of the mask bit and an enumeration identifying the number of mask bits having that condition from a respective one of a plurality of ends of the mask word.

11. A method as defined in claim 10 in which said mask word comprises "N" mask bits in bit positions Mn, n=0, ... ,N−1, each associated with one of said data units Dn, each mask bit having one of a plurality of conditions, said input data word dividing step including the steps of
   A. generating, for each bit position Mn, n=1, ... ,N−1, a parity indication Pn indicating whether the number of mask bits in bit positions M0, ... ,Mn−1 which have one of said conditions is odd or even, and, for each bit position Mn, n=0, ... ,N−2, a parity indication Qn indicating whether the number of mask bits in bit positions Mn+1, ... ,MN−1 which have another of said conditions is odd or even, and a parity indication PARITY indicating wither the total number of mask bits which have the other of said conditions set is odd, and
   B. shifting the data units and associated mask bits to appropriate locations in respective ones of said data unit portions in response to the parity signals Pn and Qn and said parity signal PARITY.

12. A computer program product for use with a computer to provide, from an input data word comprising a plurality of input data units having an input arrangement and a mask word comprising a plurality of mask bits each associated with one of said data units, an output data word in which the data units are arranged according to the mask bits, the computer program product comprising a machine readable medium having encode thereon:
   A. a bit balancer module configured to enable said computer to divide the input data units comprising the input data word into a plurality of data word portions, each data unit being assigned to one of said data word portions based on a pattern of mask bits of the mask word relative to the mask bit associated with the respective data unit; and
   B. a rearrangement module configured to enable said computer to provide, from each of the data word portions and associated mask bits, an output data word portion in which the data units are arranged according to the mask bits, the data units of the output data word portions provided by the rearrangement modules being interleaved to provide the output data word.

13. A computer program product as defined in claim 12 in which each data unit is a bit.

14. A computer program product as defined in claim 12 in which each mask bit has one of a plurality of conditions, and in which said rearrangement module comprises a "sheep and goats" module configured to enable said computer to generate the output data word portion in which the data units in the data word portion that it receives whose associated mask bits have one of said conditions are packed to one end of the output data word portion and data units bits whose associated mask bits have the other of said conditions are packed to another end of the output data word portion.

15. A computer program product as defined in claim 12 in which at least one rearrangement module comprises:
   A. a second order bit balancer module configured to enable said computer to divide the data word portion received thereby into a plurality of second order data word portions, each data unit of the data word portion received thereby being assigned to one of said data word portions based on a pattern of mask bits associated with the data units received hereby relative to the mask bit associated with the respective data unit; and
   B. a rearrangement module each configured to enable said computer to provide, from one of the data word portions and associated mask bits, a second order output data word portion in which the data units are arranged according to the mask bits.

16. A computer program product as defined in claim 12 in which each mask bit has one of a plurality of conditions, and in which the bit balancer module is configured to enable said computer to assign one of said data units to one of said data word portions in relation to the condition of the mask bit and an enumeration identifying the number of mask bits having that condition from a respective one of a plurality of ends of the mask word.

17. A computer program product as defined in claim 16 in which said mask word comprises "N" mask bits in bit positions Mn, n=0, ... ,N−1, each associated with one of said data units Dn, each mask bit having one of a plurality of conditions, said bit balancer module comprising:
   A. a parity generation module configured to enable said computer to generate, for each bit position Mn, n=1, ... ,N−1, a parity signal Pn indicating whether the number of mask bits in bit positions M0, ... ,Mn−1 which have one of said conditions is odd or even, and, for each bit position Mn, n=0, ... ,N−2, a parity signal Qn indicating whether the number of mask bits in bit positions Mn+1, ... ,MN−1 which have another of said conditions is odd or even, and a parity signal PARITY indicating wither the total number of mask bits which have the other of said conditions set is odd, and
   B. a shifter array module configured to enable said computer to shift the data units and associated mask bits to appropriate locations in respective ones of said data unit portions in response to the parity signals Pn and Qn and said parity signal PARITY.

* * * * *